Feb. 2, 1965            W. ASLAN            3,168,014
MOUNTING ARRANGEMENT FOR HYDRAULIC PISTON AND CYLINDER
Filed Sept. 11, 1962
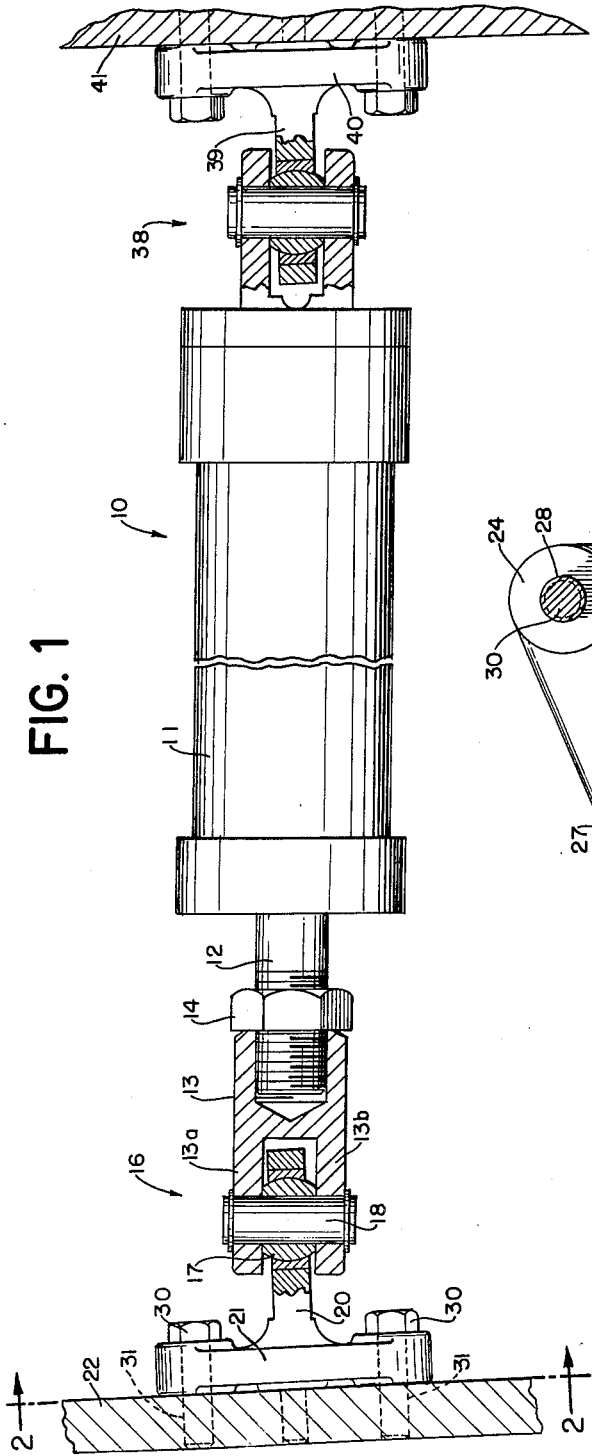
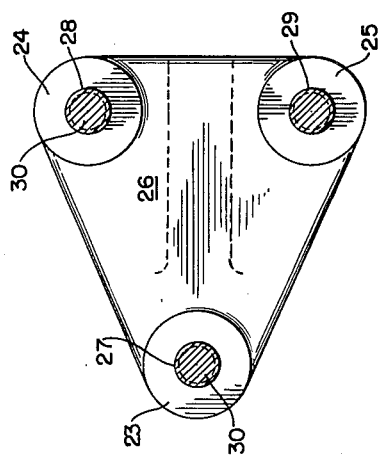
INVENTOR
Wilfred Aslan
BY
ATTORNEYS United States Patent Office
3,168,014
Patented Feb. 2, 1965

3,168,014
MOUNTING ARRANGEMENT FOR HYDRAULIC PISTON AND CYLINDER
Wilfred Aslan, Woodcliff Lake, N.J., assignor to Alkon Products Corporation, Hawthorne, N.J., a corporation of New York
Filed Sept. 11, 1962, Ser. No. 223,307
8 Claims. (Cl. 92—118)

The present invention relates to mounting arrangements for fluid motors of the single piston and cylinder variety, and more particularly to novel and improved means for attaching the mounting portions of the reciprocable parts of the piston and cylinder to an element which is to be driven.

Reciprocating piston fluid motors of various types are used extensively, for example, to supply motivating power for driving the working portions of machines whose movements are essentially reciprocable in nature. The mounting of a fluid motor of this general type involves proper fitting of the fluid motor mounts to the respectively movable and immovable parts of the machine. Heretofore this has required machining of the contacting surfaces of the fluid motor mounts and the driven element of the machine to prevent injurious distortion and strain upon one or both of the attaching structures, which would occur if the contacting surfaces were not co-planar. The expenditure of mounting and fitting time is considerable especially where the mounting surface of the member to be driven is not readily accessible to the application of ordinary machining techniques.

It is a primary aspect of the present invention to provide means for attachment of the mounting portions of a fluid motor of the type described to an element or member which is to be driven, in a manner eliminating the necessity for machining the contacting surfaces of the driven member and the fluid motor mount. The mounting provisions of the invention nevertheless result in true co-planar contact between the motor mount and driven element such that warping of either or both of the attached members will not occur.

More specifically, I have devised a novel tripod support in the form of a pad which forms the terminal connecting link between a driven member and a reciprocating piston fluid motor. The pad comprises a web having three raised mounting surfaces arranged in triangular configuration, the surfaces comprising the sole contact between the pad and the adjacent surface of a driven element. In a preferred embodiment, each of the contacting surfaces of the pad defines an opening through which a bolt may pass and the machine element will include correspondingly threaded bores for the reception of the bolts, for attachment of the pad to the machine element. By this means the pad may be firmly and securely attached to either or both of the stationary and driven parts of a machine merely by providing in the mounting portions thereof three threaded attach-holes matching the spacing of those in the pad. The machining of the driven element is thus avoided with commensurate saving in time and expense.

Since it is necessary that the reaction load on the piston be directed axially thereof in order to prevent side loads and wear upon the piston, I provide a universal joint connection between the aforedescribed mounting pad and the body of the fluid motor. Thus, any axial misalignment between the pad and the axis of the piston and cylinder, will be compensated. Such misalignment would occur, for example, notwithstanding the planar relation between the contacting surfaces of the pad and the driven element, by any departure of the mounting surface of the element from perpendicular relation respective of the axis of the piston and cylinder.

For a better understanding of the above and other advantageous features of the invention, reference should be made to the following detailed description and to the accompanying drawing, in which:

FIG. 1 is a view partially in cross-section of a tripod mounting pad and universal joint connection for a fluid driven piston and cylinder combination; and FIG. 2 is a view of the contacting surfaces of mounting pad of FIG. 1.

Referring now to the drawing, the reference numeral 10 indicates generally a fluid motor having a cylinder 11 in which a double acting piston (not shown) will reciprocate. The cylinder will be provided with appropriate fluid connections for the admission and exhaust of pressure fluid which have not been specifically illustrated since such are well-known and do not form a part of the present invention. As illustrated, the piston is connected to a shaft 12 which emerges from the body of the cylinder 11 and is internally threaded to a coupling 13. A lock nut 14 is threaded to the shaft 12 for securing the threaded attachment of the shaft to the coupling. At its opposite end the coupling 13 is of bifurcated construction having upper and lower opposed arms 13a, 13b defining a socket for receiving a ball 17. The arms 13a, 13b and the ball 17 collectively form a universal joint 16. A pin 18 is secured through top and bottom portions of the arms 13a, 13b and the ball 17.

In accordance with the invention, a mounting pad 21 is secured to the ball 17 by a connecting arm 20. The arm 20 is integral with the pad 21 in the particular embodiment and projects at its free end, within the cavity between the arms 13a, 13b and is free to rotate at that end about the ball 17. Consequently, the pad 21 is permitted limited freedom (approximately 7° total angular travel) to rotate clockwise or counter-clockwise about the joint 16 in the plane of the drawing and is permitted at least the same degree of freedom in a plane perpendicular thereto. This universal movement permits the pad 21 to be brought against an adjacent mounting surface 22 which may be non-perpendicular with respect to the axis of the piston shaft 12. The surface 22 may form for illustrative purposes, part of a machine tool (not shown) which is to be driven by the motor 10. As is common, the surface may be cast and as such will not normally be truly planar.

As best seen in FIG. 2, the pad 21, adjacent to the member 22, has three generally circular contacting surfaces 23, 24, 25 respectively, which project from the intermediate area 26 of the pad in triangular configuration. Each of the surfaces 23–25 are of relatively limited area to form as nearly as practicable, point contact against the surface of the membr 22. Consequently, the surfaces 23–25 constitute and define a single plane, and the corresponding surfaces of the member 22 which contact the surfaces 23–25 will comprise a plane coincident therewith.

The pad 21 is provided with bolt attach-holes 27, 28, 29 through the center of the surfaces 22–25 which receive bolts 30. The member 22 has correspondingly spaced threaded bores 31 for the reception of each of the bolts 30.

In the assembly of the pad 21 to the member 22, it is contemplated that the pad may serve as template for obtaining the proper spacing of each of the bores 31. Therefore, in the assembly of the parts, it will be a simple matter to place the pad against the selected surface area of the member 22, spot, drill and tap the holes 31, and thereafter bolt the pad 21 securely to the member 22. When the parts have been thus secured, since the respective contacting surfaces thereof form a single plane, no tendency will be present for either the member 22, or the pad 21 to be distorted. At the same time, since the mounting surface of the member 22 has not been machined, in all probability such surface contacting the pad 21 will not be perpendicular to the axis of the piston shaft 12, and therefore, axial misalignment of the pad 21 and the shaft 12 is to be expected. This misalignment is permitted and compensated for by the universal ball and socket connection 16. Thus, any reaction force from the pad 21 to the shaft 12 will be in an axial direction upon the piston as it reciprocates within the cylinder 11.

It will be observed that the base of the cylinder 11 at the opposite end thereof from the shaft 12 includes a coupling comprising a second, universal ball and socket connection indicated generally by reference numeral 38. The connection 38 is joined to an arm 39 of a second mounting pad 40 which is bolted to an adjacent fixed structure 41. The assembly of the pad 30 to the structure 41 is in all respects similar to the mounting of the pad 21 to the member 22, previously described. In the particular embodiment, the member 41 is stationary, the member 22 being movable in accordance with actuation by the shaft 12. By use of the tripod mounting arrangement of the invention, the piston-cylinder motor 10 may thus quickly be installed by merely placing the motor in convenient driving relation to the driven and stationary members 22 and 41 and by fastening the pads 21 and 40 to selected mounting surfaces of each member. This completely eliminates the need for machining the mounting surfaces of either element to which the fluid motor is attached.

It should be understood that the specific form of the invention herein illustrated and described is intended to be representative only, as certain changes may be made therein without departing from the clear teachings of the disclosure. Accordingly, reference should be made to the following appended claims in determining the full scope of the invention.

I claim:
1. Fluid motor driving means comprising:
   (a) a fluid cylinder,
   (b) a piston reciprocally mounted in said cylinder,
   (c) a piston shaft extending through one end of said cylinder,
   (d) a rigid mounting pad member,
   (e) rigid spacer means extending away from one face of said pad member and terminating in faces disposed in a single plane with said faces spaced apart in triangular configuration and being of limited area with respect to the area of said one face thereof and adapted to collectively define a substantially three-point contact with the element to be driven,
   (f) a bore extending through each of said spacer means in a direction substantially perpendicular to said plane for receiving bolts adapted to be secured to the element to be driven,
   (g) a rigid arm rigidly fixed to said pad member and extending away therefrom in a direction opposite to said spacer means, and
   (h) universal joint means for connecting said arm to the exposed end of said piston shaft.

2. Fluid motor driving means according to claim 1 further including:
   (a) a rigid mounting pad member connected to the other end of said fluid cylinder through a universal joint and having:
      (i) rigid spacer means extending away from one face of said pad member and having cylinder and terminating in faces disposed in a single plane with said faces spaced in triangular configuration and being of limited area with respect to the area of said one face thereof and having bores extending therethrough in a direction perpendicular to said plane.

3. Fluid motor driving means according to claim 1 further including:
   (a) a coupling member rigidly fixed to the exposed end of said piston shaft and having:
      (i) spaced arms disposed on opposite sides of the arm extending away from said pad member, and
      (ii) aligned bores extending through said arms to which said universal joint is connected.

4. Fluid motor driving means according to claim 3 in which
   (a) said universal joint includes:
      (i) a ball member having a bore extending therethrough rotatably secured to the free end of the arm extending away from said pad member, and
      (ii) a pin secured in the aligned bores of said coupling member and extending through the bore of said ball member.

5. A rigid connecting support for connecting the face of a first element to a second element comprising:
   (a) a rigid mounting pad member,
   (b) rigid spacer means extending away from one face of said pad member and terminating in faces disposed in a single plane with said faces spaced apart in triangular configuration and being of limited area with respect to the area of said one face of said pad member and adapted to collectively define a substantially three-point contact with the face of said first element,
   (c) means immediately adjacent to said spacer means for permitting connection of said pad member to said first element with said spacer means abutting the face thereof, and
   (d) rigid arm means rigidly fixed to said pad member between said spacer means and extending away therefrom in a direction opposite to said spacer means and substantially perpendicular to said plane and adapted to be secured to said second element.

6. A rigid connecting support according to claim 5 further including:
   (a) a coupling member adapted to be rigidly secured to said second element, and
   (b) universal joint means connecting said arm to said coupling member whereby said arm will be secured to said second element through said universal joint and said coupling member.

7. A rigid connecting support according to claim 6 wherein:
   (a) the faces of said spacer means define circles, and
   (b) the means for permitting connection of said pad member to said first element includes a bore extending through each of said spacer means in a direction substantially perpendicular to said plane to receive a bolt for securing said pad to said first element.

8. A rigid connecting support according to claim 7 wherein:
   (a) said coupling member includes:
      (i) spaced arms disposed on opposite sides of the arm extending away from said pad member, and
      (ii) aligned bores extending through said arms,
   (b) said universal joint includes:
      (i) a ball member having a bore extending therethrough rotatably secured to the free end of the arm extending away from said pad member, and
      (ii) a pin secured in the aligned bores of said coupling member and extending through the bore of said ball member.

References Cited in the file of this patent
UNITED STATES PATENTS

| | | |
|---|---|---|
| 2,082,597 | Ponce | June 1, 1937 |
| 2,167,962 | Sovis | Aug. 1, 1939 |
| 2,431,100 | Woods | Nov. 18, 1947 |
| 2,453,742 | Bowen et al. | Nov. 16, 1948 |
| 2,491,246 | Bloomfield | Dec. 13, 1949 |
| 2,819,873 | Pearne | Jan. 14, 1958 |
| 2,918,039 | Boje et al. | Dec. 22, 1959 |
| 2,918,224 | Hornberger | Dec. 22, 1959 |
| 2,958,508 | Martinez | Nov. 1, 1960 |
| 3,006,606 | Pohl et al. | Oct. 31, 1961 |
| 3,059,883 | Matthiessen | Oct. 23, 1962 |

UNITED STATES PATENT OFFICE
CERTIFICATE OF CORRECTION

Patent No. 3,168,014             February 2, 1965

Wilfred Aslan

It is hereby certified that error appears in the above numbered patent requiring correction and that the said Letters Patent should read as corrected below.

Column 2, line 56, for "22-25" read -- 23-25 --; column 3, line 64, for "having" read -- said --.

Signed and sealed this 29th day of June 1965.

(SEAL)
Attest:

ERNEST W. SWIDER
Attesting Officer

EDWARD J. BRENNER
Commissioner of Patents